(12) United States Patent
Martin (10) Patent No.: US 9,249,924 B1
(45) Date of Patent: Feb. 2, 2016

(54) MOBILE DEVICE RETENTION SYSTEM (71) Applicant: Paul Martin, Irvine, CA (US)

(72) Inventor: Paul Martin, Irvine, CA (US)

(*) Notice: Subject to any disclaimer, the term of this patent is extended or adjusted under 35 U.S.C. 154(b) by 0 days.

(21) Appl. No.: 13/910,114

(22) Filed: Jun. 5, 2013

Related U.S. Application Data (60) Provisional application No. 61/655,435, filed on Jun. 4, 2012.

(51) Int. Cl.
*A47B 96/00* (2006.01)
*F16M 13/02* (2006.01)
*H05K 5/03* (2006.01)

(52) U.S. Cl.
CPC . *F16M 13/02* (2013.01); *H05K 5/03* (2013.01)

(58) Field of Classification Search
CPC ....... F16M 11/00; F16M 11/38; F16M 13/00; A47B 23/043; H05K 5/03
USPC .............. 248/221.11, 121, 125.8, 160, 176.1, 248/309.1, 346.03, 225.11, 220.21, 223.41, 248/146, 423, 205.1; 455/575.1, 575.4; 379/454, 455
See application file for complete search history.

(56) References Cited

U.S. PATENT DOCUMENTS

| | | | | |
|---|---|---|---|---|
| 5,820,095 A | * | 10/1998 | Stone | B43K 23/002 211/69.1 |
| D672,783 S | * | 12/2012 | Robinson | D14/447 |
| 8,565,832 B2 | * | 10/2013 | Asabu | G06F 1/1626 455/566 |
| 8,746,638 B2 | * | 6/2014 | Carney | H04M 1/0202 248/176.1 |
| 2012/0098493 A1 | * | 4/2012 | Budike | H02J 7/0044 320/111 |
| 2012/0138766 A1 | * | 6/2012 | Chen | A47B 23/043 248/456 |
| 2013/0043777 A1 | * | 2/2013 | Rayner | G06F 1/1626 312/296 |

* cited by examiner

*Primary Examiner* — Todd M Epps
(74) *Attorney, Agent, or Firm* — Kafantaris Law Offices; Theo Kafantaris (57) ABSTRACT

The present invention will provide a mobile device retention unit which combines the protective quality of a case as well as the utility of an adjustable mount onto a desk and will enhance the quality of the audio produced. Furthermore, the present invention will allow for the integration of the rising popularity of mobile devices into a school or work setting. This is accomplished by creating a case that mounts onto a desk, while allowing for an adjustable angle and easy accessibility.

7 Claims, 7 Drawing Sheets

Cross-Sectional View

MOBILE DEVICE RETENTION SYSTEM

CROSS-REFERENCE TO RELATED APPLICATIONS

The present application claims the benefit of U.S. Provisional Patent Application No. 61/655,435, filed on Jun. 4, 2012, which is incorporated herein by reference.

STATEMENT REGARDING FEDERALLY SPONSORED RESEARCH AND DEVELOPMENT

Not Applicable.

FIELD OF THE INVENTION

This invention relates to a mobile device retention system, and more particularly, to an apparatus for securely retaining a mobile device which can be adjusted easily.

DISCUSSION OF RELATED ART

A mobile device can generally be described as an apparatus capable of accessing and computing data remotely using a wireless connection. Mobile device features include making and receiving phone calls, accessing email, sending and receiving messages, downloading and executing mobile applications, GPS navigation, camera, video, and other means of manipulating data remotely. Current leaders in mobile device software include Apple IOS, Google Android, and Microsoft Windows Phone.

Mobile device accessories pertain to hardware or software which can be used with or attached to a device which are not integral to the primary function of the device. The most common accessory to modern mobile devices is a protective case, which can be made from a variety of different materials, depending on the desired utility. The primary function of a case is to protect the user from causing unintentional damage to their mobile device, without limiting its functionality.

A desk is a type of furniture, generally resembling but not limited to a table. Generally, the function of a desk is to provide the user with a raised and flat surface upon which to complete tasks. Student desks are a subclass of desks which are specifically designed for work in a classroom setting. These are typically made of wood or metal, and in some cases, the desk can be directly attached to the seat.

While mobile device retention units exist in the prior art, they are often limited to in functionality and personalization. Increasing display size, computational power, audio capabilities, and functionality of mobile devices as led to growth in protective cases and retention units. Therefore, a need exists for a mobile device retention system that allows for the protection, utility, and audio enhancement of a mobile device, which can also be used in a workspace, including that of a school setting.

SUMMARY OF THE INVENTION

The present invention will provide a mobile device retention unit which combines the protective quality of a case as well as the utility of an adjustable mount onto a desk and will enhance the quality of the audio produced. Furthermore, the present invention will allow for the integration of the rising popularity of mobile devices into a school or work setting. This is accomplished by creating a case that mounts onto a desk, while allowing for an adjustable angle and easy accessibility.

The mobile device retention unit will be ideal for creating a unified classroom experience that uses the power of modern technology, essentially turning a mobile device into a temporary desktop for doing schoolwork. Other embodiments include a non-desk mounting system as well as an acoustic retention system, which removes the limitations of a classroom-only device.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention discloses a mobile device retention unit 10 comprising a mounting bracket 20 and a retention unit 21. The mounting bracket 20 will generally have a 'C' shape having a lower arm 22 and an elongated upper arm 23. The gap 24 formed between the lower and upper arms 22, 23 of the mounting bracket 20 will be designed to fit onto a desk, and attached using a mounting means 25. In the preferred embodiment, the mounting means 25 comprises a lower magnet 26 in the lower arm 22 and an upper magnet 27 placed within the desk of opposing polarity. Other methods of attachment can include, but are not limited to, using friction or suction between the mounting bracket 20 and desk and using a magnet to attach the mounting bracket 20 to a table leg. The upper arm 23 further comprises an adjustable means for retaining the retention unit 21 and a series of grooves 28 for adjusting the height and angle of the retention unit 21.

The retention unit 21 comprises a hollow wooden rectangular prism with a generally rectangular base 31, without a top or front panel. Two mounting drawers 32, 33 are adapted to represent the top and front panels, each mounting drawer 32, 33 comprising two panels 34 connected in an L shape. The first mounting drawer 32 will slide into position to create the front face of the closed retention unit 21. The front panel 34 of the first mounting panel 32 will be parallel to and the same size as the back panel 36 of the retention unit 21. The top panel 37 of the mounting drawer 32 will span the full width of the retention unit 21, but only half of the depth. A means of securing a mobile device will be included on the first mounting drawer 32. In the preferred embodiment, the means of securing a mobile device include magnets placed on the back of the mounting panel 34 in the same polarity arrangement.

A second mounting drawer 33 comprises the same width and height as the first mounting drawer 32. The first and second mounting drawers 32, 33 are capable of sliding in and out of the retention unit 21 from the open side 38. The mounting drawers 32, 33 can be removed from the device 10 and used within the grooves 28 for an adjustable angle. Alternatively, when placed within the retention unit 21, the device 10 will resemble a closed box. The front side 35 of the second mounting drawer 33 will have an erasable writing surface 39 for dry-erase or similar markers. The grooves 28 in the mounting bracket 21 will allow for the interchangeability of the drawers 32, 33.

In the preferred embodiment, the mounting bracket 21 will be 4 inches tall, 3 inches wide, with the upper arm 23 being 6 inches deep and lower arm 22 being 3 inches deep, although other suitable sizes may be used. The arms 22, 23 will be made of a rigid and durable material capable of resisting impact and maintaining form, such as wood, ABS plastic, metal, or an alloy. The retention unit 21 in its closed form will be 10 inches tall, 9 inches wide, and 3 inches deep, although alternative sizes may be used to conform to different mobile devices. The drawers 32, 33 will each have top panels 37 being 1.5 inches deep and 9 inches wide and front panels 34 being 10 inches tall, 9 inches wide. Except for the front panel 35 of the second mounting drawer 34, all panels 34 will be made of a durable and rigid material similar to that of the arms 22, 23 of the mounting bracket 20. In an alternative embodiment, sheet metal is used as the preferred material. In yet a further alternative embodiment, no magnets 26, 27 are used to retain the device. The front side 35 of the second mounting drawer 33 will have the inward facing side 40 made of this material, and the outward side 41 made of a dry-erase friendly material, such as a white-board 39.

The mounting bracket 20 comprises a plurality of grooves 28 on the upper arm 23, one nearer to the open front end 29, and one at the closed back end 30. The grooves 28 in the front 29 will be designed to comfortably fit the back edge of the top panel 34 of either mounting drawer 32, 33. When the second drawer 33 is inserted, this allows for the whiteboard surface 39 to lie at a minimal angle for writing on the desk. The back grooves 30 will be designed to fit and support the bottom base 31 of the open retention unit 21. This allows for the mounting bracket 20 to hold the retention unit 21 as a typical HUD for the mobile device. In an alternative embodiment, the grooves 28 are replaced with an alternative means of attachment which allow for easy adjusting the angle.

In an alternative embodiment, the mounting bracket 20 will be replaced by a mounting stand 51, which consists of a ground unit 52 and an elongated shaft 53 with a mounting tip 54. The ground unit 52 will be a heavy, short, and solid base to provide support for the elongated shaft 53 and attached retention unit 21. The elongated shaft 53 will be made of a sturdy yet flexible material with its proximal end 55 fixed to the top of the center of the ground unit 52 and its distal end 56 fixed to the rear of the retention unit 21.

In the above alternative embodiment, the ground unit 52 of the mounting stand 51 will be 8 inches wide, 2 inches tall, 12 inches deep, and be made of a solid wood or metal material. The elongated shaft 53 will be 4 feet long and 2 inches in diameter, and made of a flexible, yet sturdy, wire metal. The mounting tip 54 will directly latch onto the bottom base 31 of the retention unit 21, or in alternate embodiments, to the back of the retention unit 21, and be made of the same material as the retention unit 21.

In a further alternative embodiment, the retention unit 21 can be replaced by an acoustic retention unit 61. The acoustic retention unit 61 is similar to the original retention unit 21, with a few differences. The acoustic mounting drawer 62 will not have magnets to attach the mobile device to, but rather have carefully positioned acoustic apertures 64 to accommodate sound reverberations. The second mounting drawer will be excluded entirely, and replaced by a smaller locking panel 63 which descends from the top 65 of the acoustic retention unit 61 to mount and lock the mobile device. Centered on the front face 66 of the locking panel 63 will be a knob 67 for easily locking a mobile device in position. On the bottom panel 68 of the acoustic retention unit 61, a series of auxiliary apertures 69 are positioned to allow power and auxiliary wires to engage with the mobile device. The top of the acoustic retention unit 61 will be hinged to the back panel of the acoustic retention unit 61, wherein the top will open, permitting the mobile device to slide within the acoustic retention unit 61 and be secured by the locking panel 63. The acoustic apertures can also be applied to the first embodiment.

The grooves for the original mounting drawer 22, 23 will be absent, leaving only the inner drawer grooves 70, which will be the default location for the acoustic mounting drawer 62. The locking panel 63 will slide down from the open top of the retention unit along the front face 66 of the acoustic retention unit 61 and come to rest on the top of the mobile device. The locking panel 63 will span the full width of the front panel of the acoustic retention unit 61, having a 1 inch height and a 0.5 inch depth, and be made of the same materials as the rest of the acoustic retention unit 61. In an alternative embodiment, the locking panel 63 will further comprise a diamond-shaped knob on opposing ends of the panel, such that when the locking panel is forced downward to secure the mobile device in place, the diamond shape of the knobs within the side grooves will secure the device in position. In other words, this rotational event will cause the device to lock in a secure position, preventing it to shake loose, even when upside-down. Alternatively, the drawer grooves 70 will seat the mobile device (with no mounting drawer 62) and the locking panel 63 will secure the mobile device with a knob, using friction.

Figure 1:
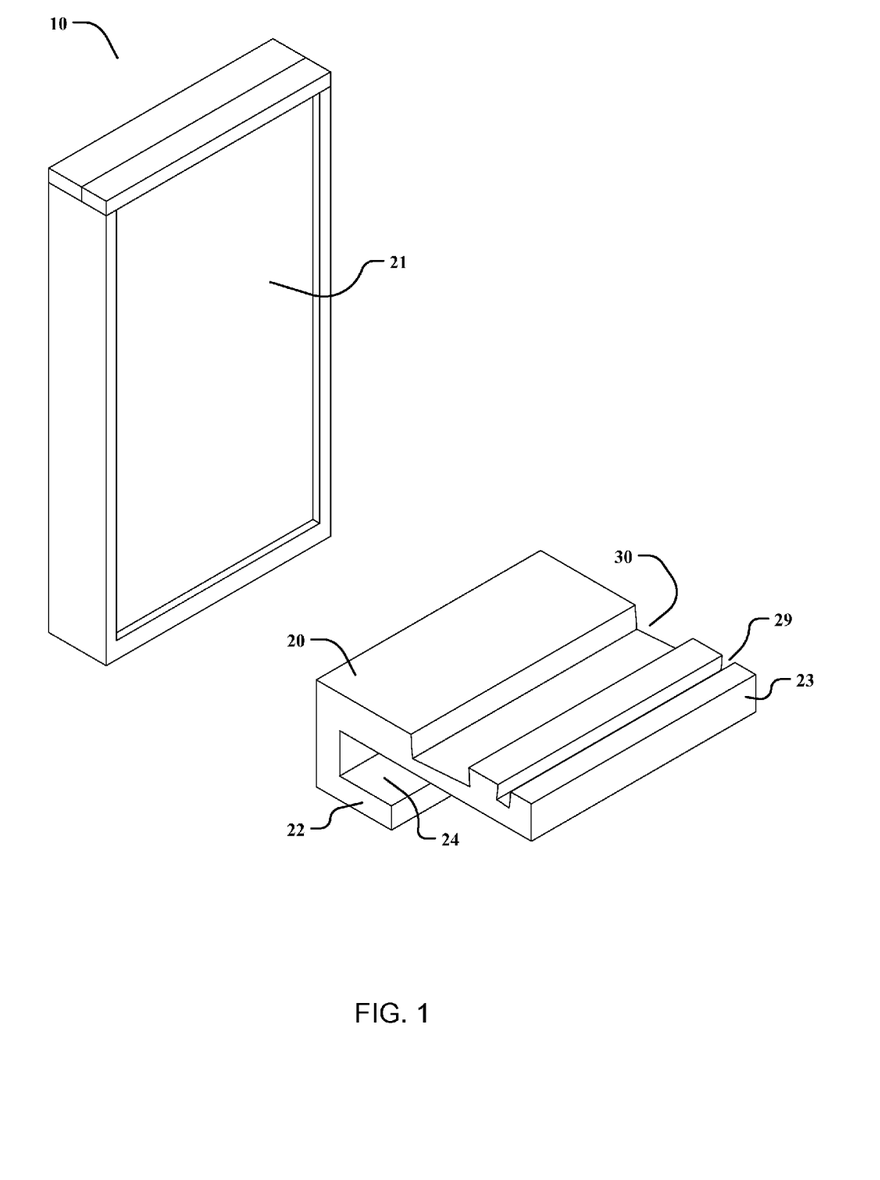
FIG. 1 is a perspective view of the separated mobile device retention unit.
Figure 2:
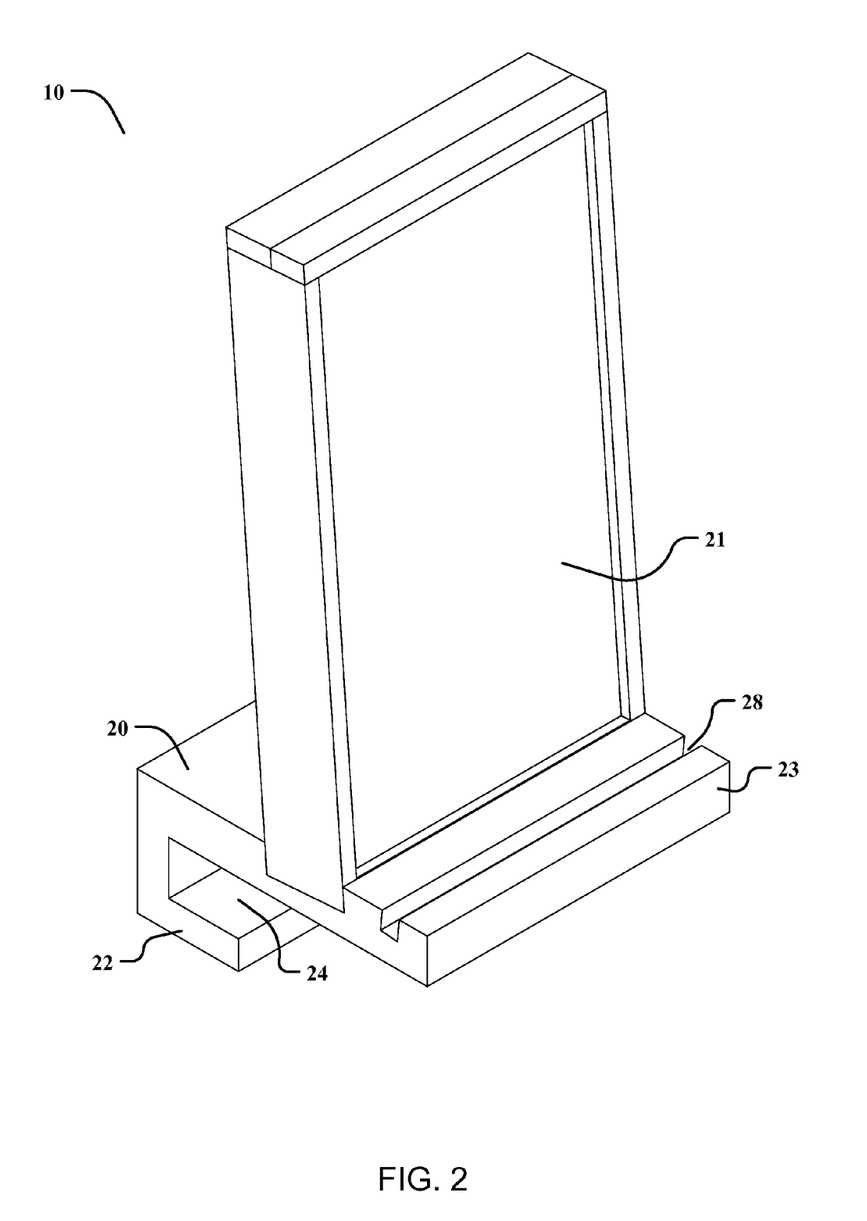
FIG. 2 is a perspective view of the combined mobile device retention unit.
Figure 3:
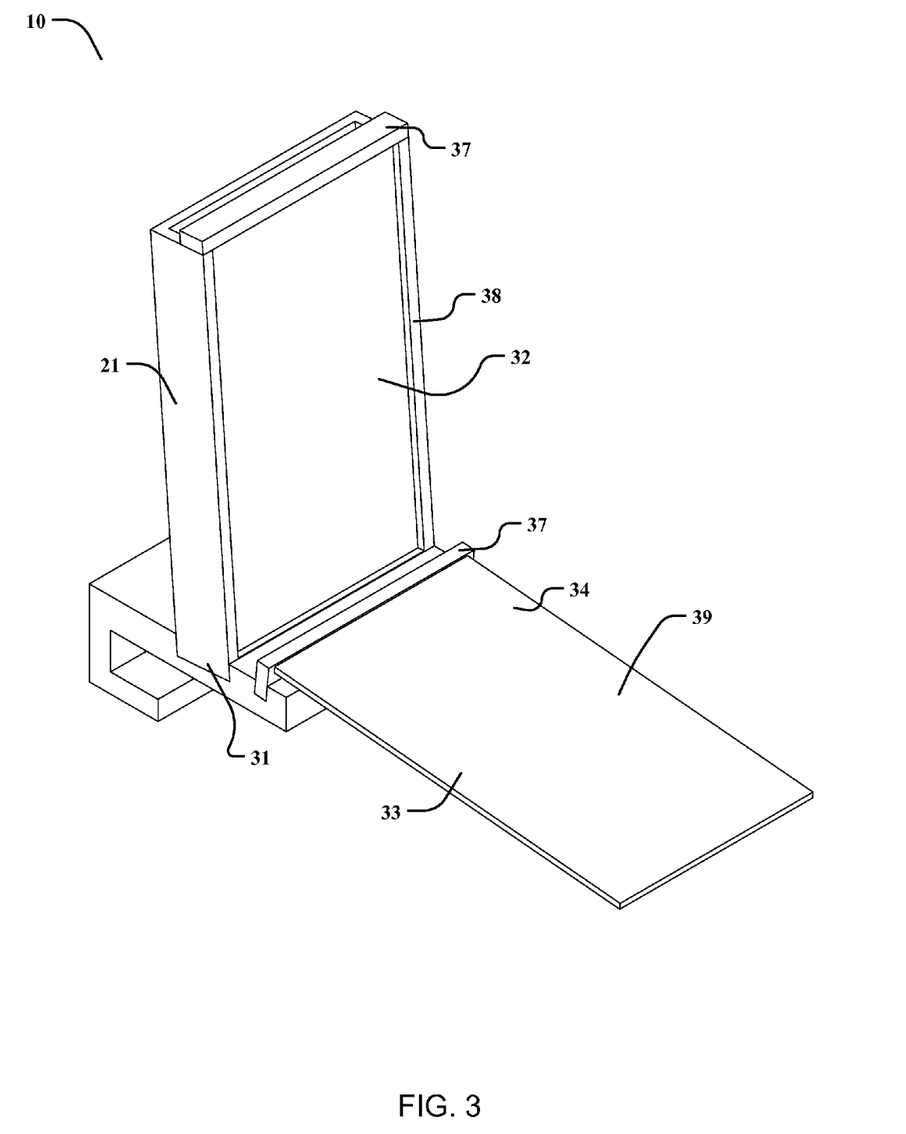
FIG. 3 is a perspective view of the combined mobile device retention unit with an angled mounting drawer.
Figure 4:
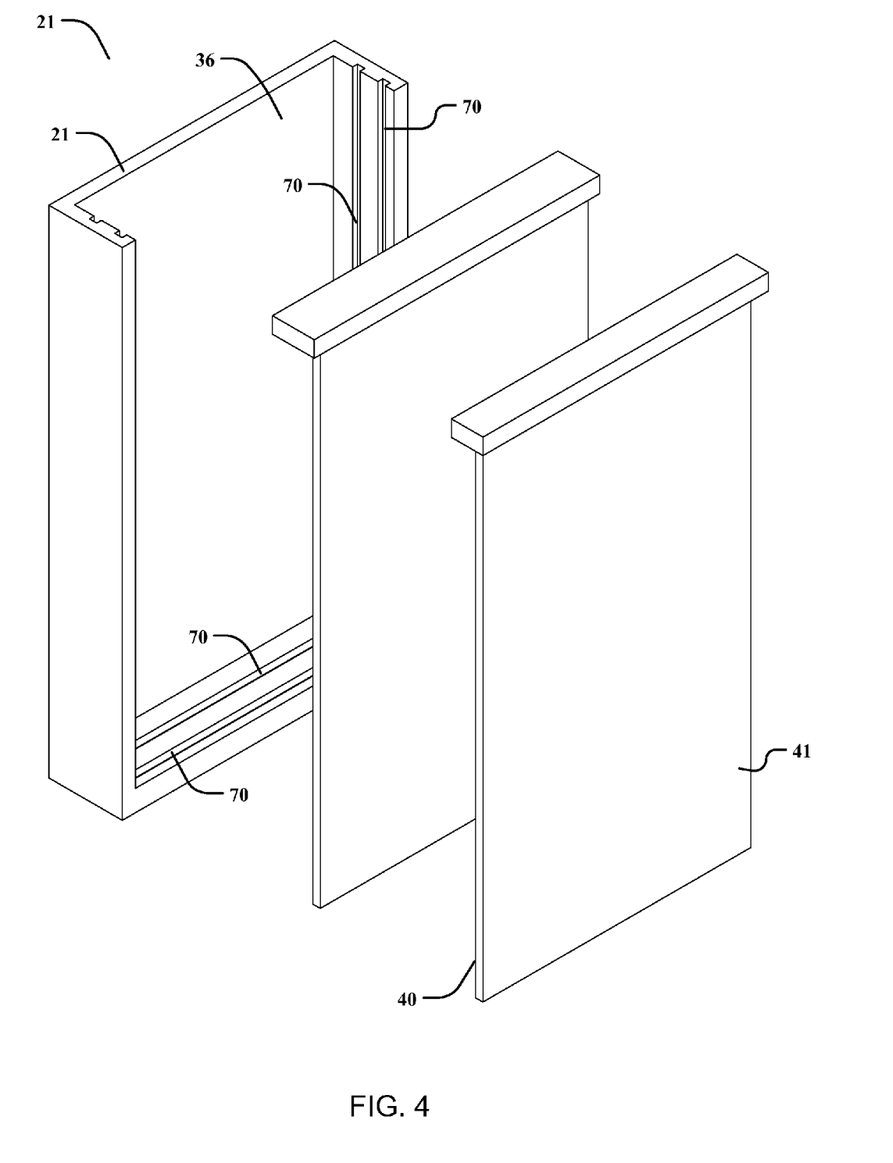
FIG. 4 is a perspective view of the mobile device retention unit with mounting drawers removed.
Figure 5:
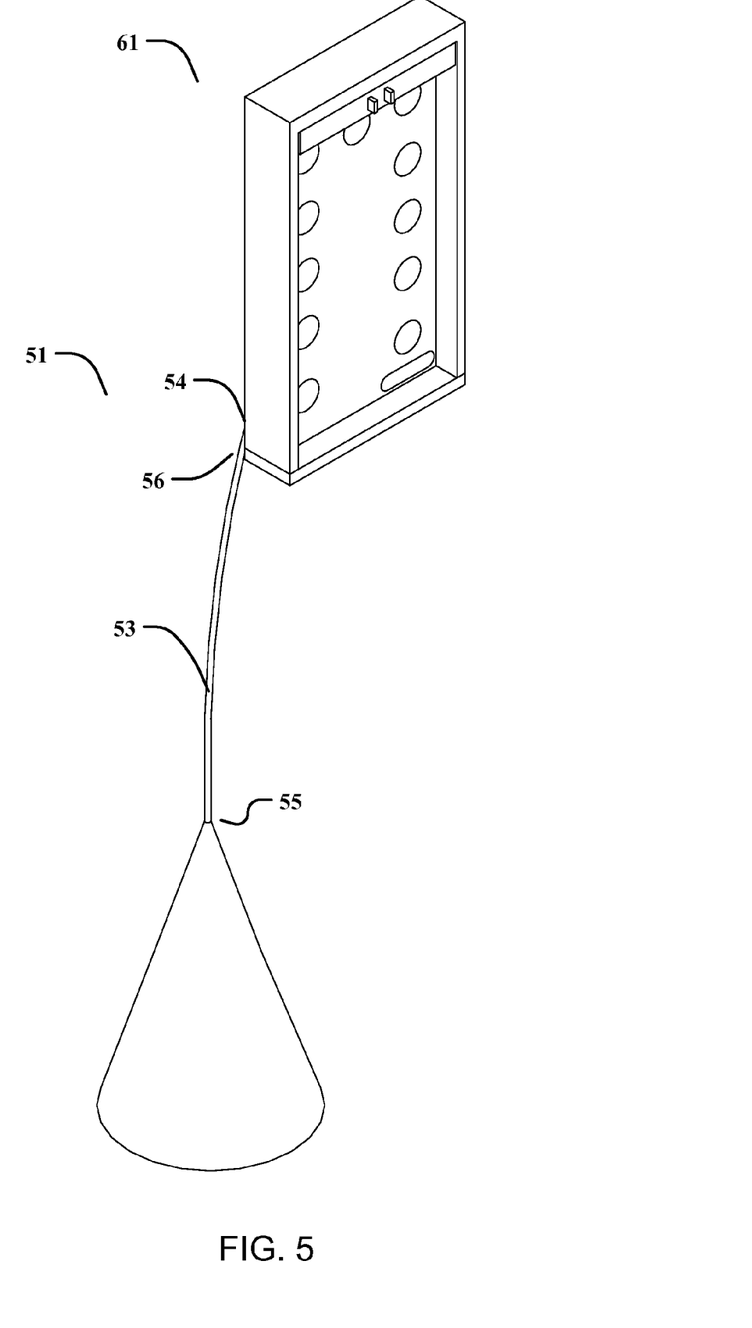
FIG. 5 is a perspective view of the mobile device retention unit according to an alternative embodiment.
Figure 6:
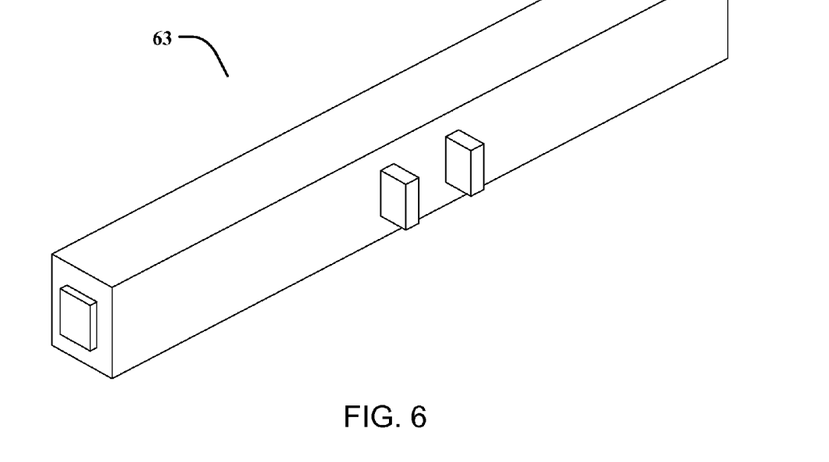
FIG. 6 is a perspective view of the locking panel.
Figure 7:
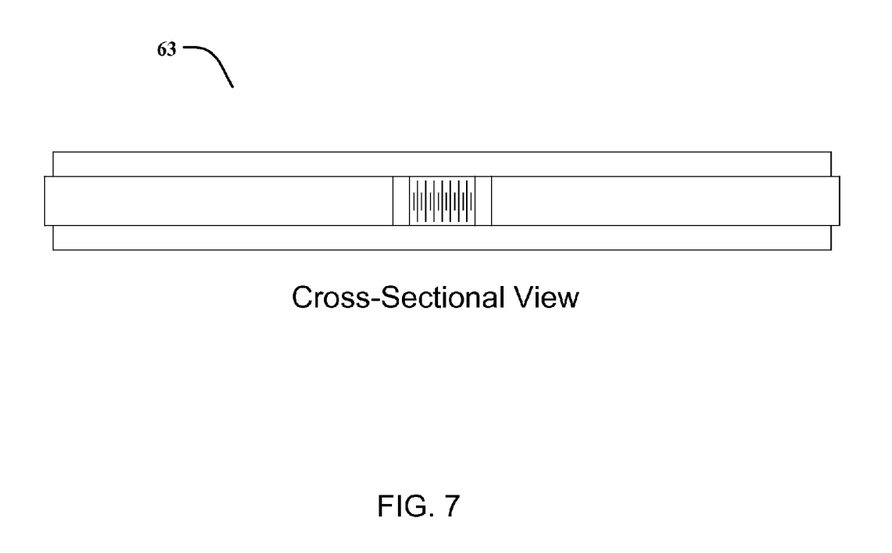
FIG. 7 is a top cross-sectional view of the locking panel.
Figure 8:
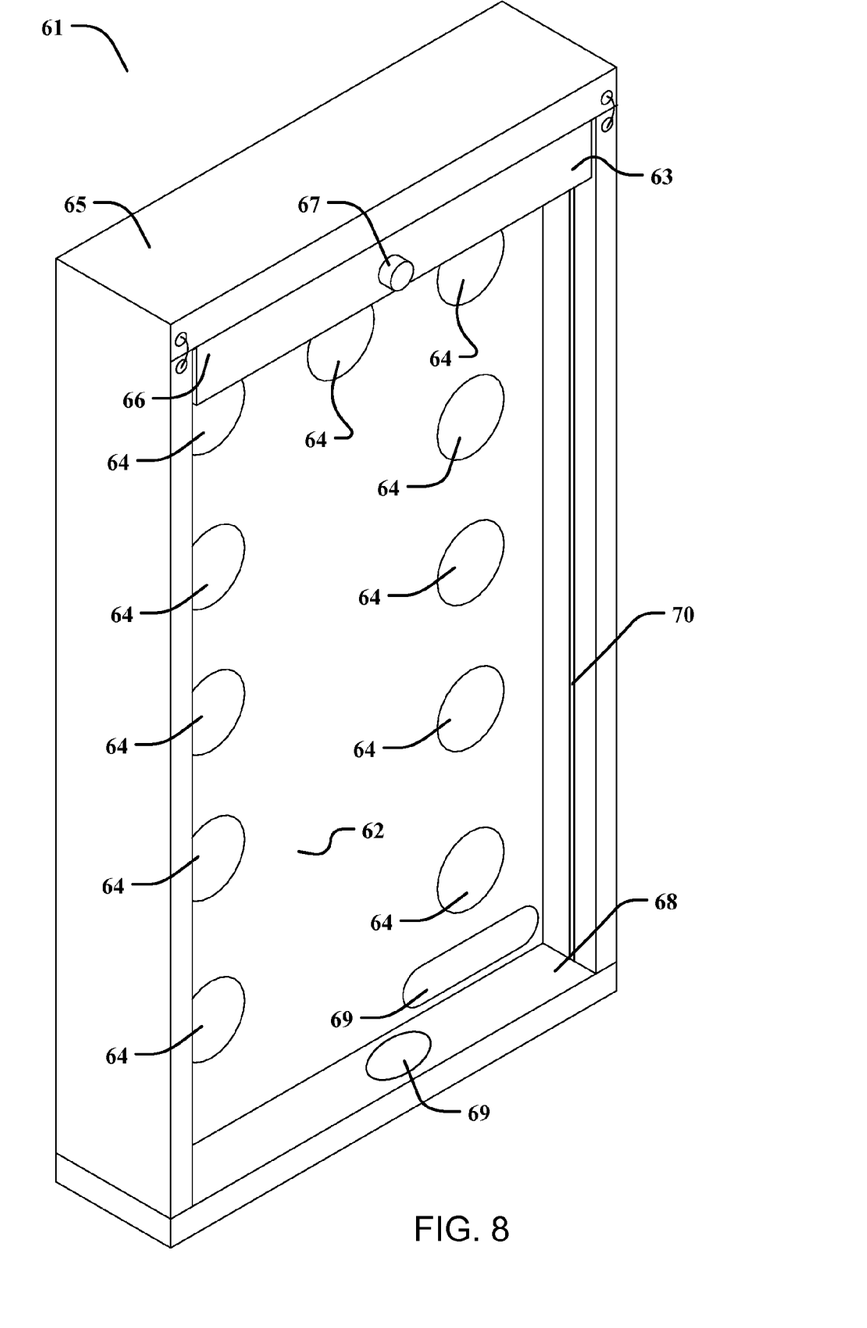
FIG. 8 is a perspective view of the mobile device retention unit and locking panel.

In yet a further alternative embodiment, the locking panel 63 will comprise a hollow elongated rectangular shaft (FIG. 6) having opposing spring-loaded release handles. The handles are attached to opposing rubber supports, wherein a spring or other compression system provides opposing force, causing each rubber support to protrude from either end of the elongated shaft. To release the rubber supports, the handles will be compressed together, preferably with a thumb and index finger, while the locking panel is adjusted. The elongated shaft will be made from a lightweight, sturdy material, such as aluminum, plastic, or sheet metal. A plurality of magnets may be included in the locking arm for use with attracting the sheet metal layer directly beneath a thin sheet of plastic or wood veneer on the top of the surface for additional security.

While the above description contains specific details regarding certain elements, sizes, and other teachings, it is understood that embodiments of the invention or any combination of them may be practiced without these specific details. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A mobile device retention system, comprising:
    a mounting bracket
    a retention unit for retaining a mobile device; and
    a first mounting drawer having a plurality of acoustic apertures;
    wherein said mounting bracket will retain said retention unit upright for viewing by a user and wherein said acoustic apertures enhance a quality of an audio produced by said mobile device.

2. The mobile device retention system according to claim 1, wherein said mounting bracket comprises:
    a plurality of grooves;
    a lower arm;
    an upper arm; and
    a gap between said lower and upper arms for attachment to a table.

3. The mobile device retention system according to claim 1, wherein said retention unit further comprises:
    a second mounting drawer;
    wherein said mounting drawers slide in and out of said retention unit.

4. The mobile device retention system according to claim 3, wherein said second mounting drawer further comprises an erasable surface.

5. The mobile device retention system according to claim 1, wherein the retention unit further comprises a top and back panel.

6. The mobile device retention system according to claim 5, wherein said top is hinged to said back panel.

7. The mobile device retention system according to claim 5, wherein said top is fixedly attached to said first drawer.

* * * * *